United States Patent
Leva

[11] Patent Number: 5,000,883
[45] Date of Patent: Mar. 19, 1991

[54] APPARATUS AND METHOD FOR SUPPORTING PACKING IN MASS TRANSFER TOWERS AND SUBSEQUENT LIQUID REDISTRIBUTION

[76] Inventor: Max Leva, 1 Hodgson Ave., Pittsburgh, Pa. 15205

[21] Appl. No.: 425,307

[22] Filed: Oct. 23, 1989

[51] Int. Cl.$^5$ .............................................. B01F 3/04
[52] U.S. Cl. ................................................... 261/97
[58] Field of Search ........................... 261/94, 97, 96

[56] References Cited

U.S. PATENT DOCUMENTS

| | | | |
|---|---|---|---|
| 3,259,380 | 7/1966 | Brown | 261/97 |
| 3,419,253 | 12/1968 | Eckert | 261/97 |
| 4,171,333 | 10/1979 | Moore | 251/94 |
| 4,432,913 | 2/1984 | Harper et al. | 261/97 |
| 4,744,929 | 5/1988 | Robinson et al. | 261/97 |

Primary Examiner—Tim Miles
Attorney, Agent, or Firm—William J. Ruano

[57] ABSTRACT

A counter-current operating, gas-liquid or vapor-liquid contact tower having a plurality of randomly dumped mass and heat transfer media. The improvement comprises first means for collecting and redistributing the flow to a lower positioned mass and heat transfer media and second means for introducing gas into an upwardly positioned mass and heat transfer media. More specifically, it comprises first construction elements in the form of horizontal, elongated troughs separated by substantial widths from each other having upturned sides extending angularly outwardly, the ends of said troughs abutting a circumferential flow channel, and second construction elements directly supported by said upturned sides, said second construction elements extending upwardly of said first construction elements.

11 Claims, 1 Drawing Sheet

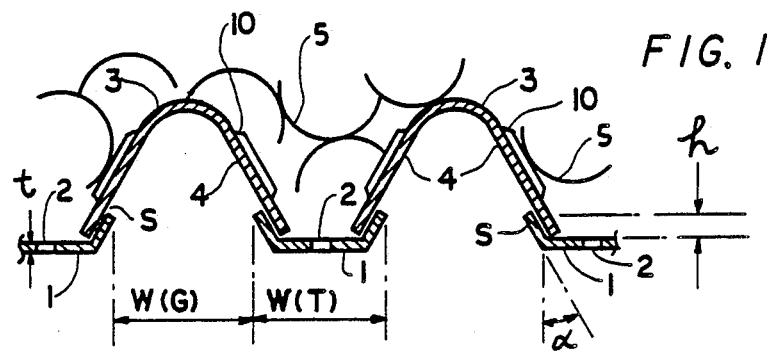
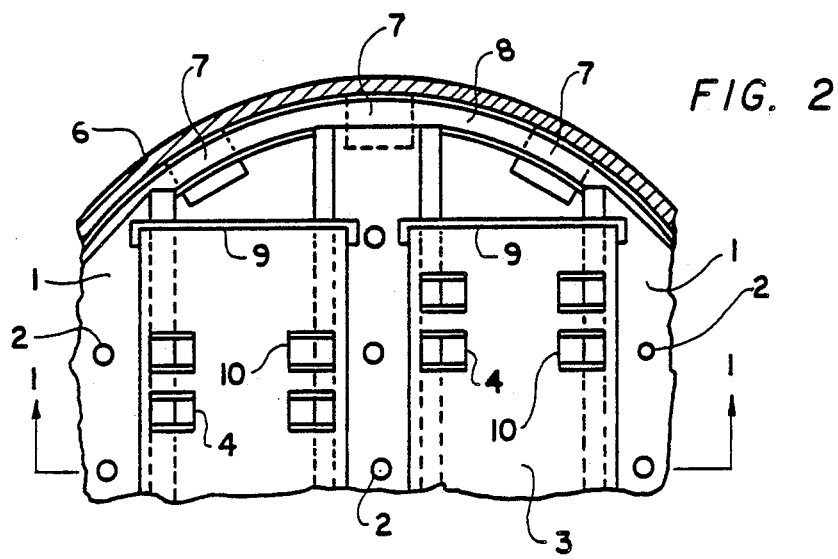
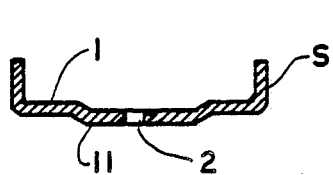
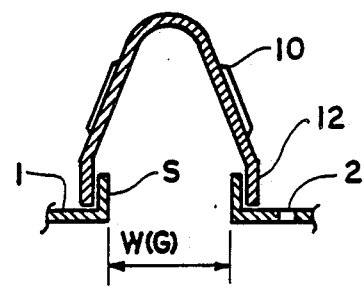
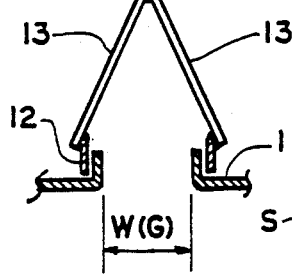
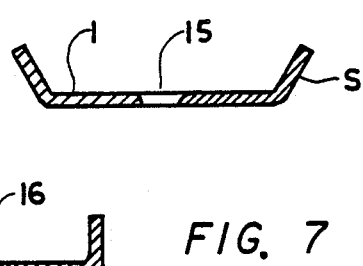

APPARATUS AND METHOD FOR SUPPORTING PACKING IN MASS TRANSFER TOWERS AND SUBSEQUENT LIQUID REDISTRIBUTION

BACKGROUND OF THE INVENTION

Whenever packed towers of appreciable packed height, say generally speaking, in excess of 20 feet, are involved, it is desirable to arrange the packings in a series of vertical beds. There are many reasons for that-,—the most obvious ones being (1) excessive weights generated by some packings when employed in one single bed, (2) deteriorating internal liquid distribution in the packed bed, that must be corrected if a reasonable mass transfer efficiency is to be maintained, and (3) the packed heights may have to be broken up into vertical sections to allow for normal process manipulations, as demanded by feed introduction and liquid and gas or vapor withdrawals.

Whenever such a break-up of a vertical bed into seccessive sections is mandatory, there is required a device generally known as a packing support plate, that supports the packed section in the tower.

Such packing support plates may be of many designs, as in "Norton Packed Tower Intervals" Bulletin TA-80, Copyright 1974, Norton Co. Akron, Ohio 44309. Besides supporting packings, these devices permit also various implementations of gas or vapor referred to as "gaseous medium" introductions into the packings.

Of course, since the packings usually operate in counter-current flow, with gas rising and liquid descending, the supports must also allow a simultaneous discharge of liquid from the base of the packed section. Normally, the conventional packing support plates facilitate such a liquid discharge. However, since the liquid thus discharged from such a vertical section must normally be carefully redistributed to the top of the next tower section, the "liquid distribution capability" of common packing support plates is usually not sufficiently good to produce the best mass transfer of the packed section below, which it thus irrigates.

This being the true state of affairs, in order to implement the best functioning of which the packing is capable, it has been the practice to follow up such packing support plates with subsequent liquid redistribution devices to the packed section below.

This practice is particularly well illustrated by the design shown on page 4.0 of the aforementioned Norton Bulletin T-80, where a packing support plate is shown, followed up by such a separate liquid redistributor.

Whereas this separate arrangement may accomplish the desired purposes, namely supporting the packing and redistributing the liquid to the packed section below, it has the obvious drawbacks of much greater cost and lesser convenience than would be experienced if the two functions of packing support and liquid redistribution could be achieved by one single composite apparatus.

SUMMARY OF THE INVENTION

It has now been found, quite surprisingly and completely unexpectedly, that a completely satisfactory implementation of packing support and liquid redistribution will result when the two functions are combined and implemented by one single composite unit, as is illustrated by FIGS. 1 to 4.

BRIEF DESCRIPTION OF THE DRAWING

FIG. 1 shows a partial elevational view of a section of the device taken along line 1—1 of FIG. 2;

FIG. 2 shows a partial plan view of the elevation shown in FIG. 1;

FIG. 3 shows a modification of what is termed the liquid redistribution element;

FIG. 4 shows a modification of what is termed the gas injection element;

FIG. 5 shows another modification of the gas injection element;

FIG. 6 shows a modification of the liquid discharge orifice in the liquid redistribution element; and FIG. 7 show additional modifications in the orifice in the liquid redistribution element.

DESCRIPTION OF THE PREFERRED EMBODIMENTS

Considering now in detail FIG. 1, numeral 1 denotes the first construction elements of the invention. These are seen to be horizontal elongated troughs of width W (T) and material thickness t. The sides of the troughs, denoted by letter S, are bent upwardly, defining an angle $\alpha$ with the vertical. As will be seen, the troughs are provided with liquid drain holes, designated by numeral 2, through which the liquid coming from the packed section above passes to the packed section below.

The second construction elements of the invention, denoted by numeral 3, represent elongated chambers of width W (G), extending upwardly of the horizontal elongated trough elements, and referred herein as the gas injection element. An essential feature of the gas injection elements is that they must be equipped with suitable openings or apertures, designated by numeral 4, through which the gas passes into the packing pieces that are on top of and surround the gas injection elements, on both sides, as is designated by numeral 5.

Referring to FIG. 2, the shell of the vessel carrying the packings has been denoted by numeral 6. Attached to the inside of shell 6 are lugs 7 which serve the purpose of supporting a circumferential liquid flow channel 8. Whereas the circumferential flow channels may be supported by individual lugs, as shown in FIG. 2, they may also be supported by other means, as for instance by circumferential rings which may either be attached to the inside tower wall or may be positioned between adjacent tower shell flanges. (not shown)

In assembling and installing the packing support-liquid redistribution apparatus, it is first of all necessary to arrange the circumferential liquid flow channels within the tower shell. This may either be done by inserting them as a whole, if the tower is provided with a suitable removable top, or the circumferential liquid flow channels may be arranged in the tower sectionally through proper manways, care to be taken to join the sections together liquid-tight by sealing means, such as gaskets, cements, tongue and groove constructions or other means.

Once the circumferential liquid flow channels are in place, the first construction elements, designated by numeral 1, are attached to the circumferential liquid flow channels, as is shown in FIG. 2. This may be implemented by aligning the ends of the first construction elements with properly formed and provided cut-outs in the inside wall of the circumferential liquid flow channels, and providing liquid-tight seals, made by various means, such as, for instance, gasketing, cementing or press fits.

With all of the first construction elements 1 thus installed, the second construction elements, designated by numeral 3, and representing the elongated flow chambers, are next installed, alternatingly between the first construction elements, 1, and covering the elongated gaps between the first construction elements. It will be seen from FIG. 2 that the second construction elements do not extend all the way to the wall of the tower. In order to prevent gas from escaping from the ends of the gas injection elements 2, their ends have been blanked off by covers 9.

After the apparatus is thus assembled in the tower, the packing may be added and the tower is ready for operation. If operated counter-currently with liquid coming down and gas rising, it will be noted that by virtue of the contact of the packings with the rims of as flow passages 10 in the gas injection elements, the liquid is discharged in situ on the metal surfaces and is conducted downwardly into the troughs, wherein the liquid forms a head, designated by letter h, and which causes the liquid to discharge through the openings 2 into the top of the packed bed below. By virtue of having all trough liquid redistribution elements abut with the circumferential liquid flow channels, a constant head h in all of the liquid redistribution elements is assured and a uniform constant rate of discharge is provided. The gas, on the other hand, passes through the apertures 4 into the packings, virtually unmolested by any liquid coming from the packing. Thus the gas is exposed to the least flow resistance possible.

In FIG. 5, the second construction elements are shown as formed by thin elongated strips spaced close to each other.

While I have illustrated and described several embodiments of my invention, it will be understood that these are by way of illustration only and that various changes and modifications are contemplated in my invention within the scope of the following claims.

I claim:

1. In a counter-currently operating gaseous medium-liquid contact tower containing a plurality of packing pieces for mass and heat transfer, the improvement comprising first construction elements in the form of horizontal elongated troughs for collecting and distributing downflowing liquid to lower packing pieces, separated by substantial widths from each other, having upturned sides, extending angularly outwardly, the ends of said troughs abutting a horizontal circumferential flow channel within the interior of said contact tower, and perforated second construction elements for introducing gas upwardly to said packing pieces and being entirely separate from the aforementioned first construction elements, and said second construction elements resting removably within the upturned sides of the first construction elements.

2. In apparatus used in gas-liquid counter-currently operated randomly dumped packed beds contained in contacting towers, the improvement being the provision of said apparatus comprising first construction elements, as defined by horizontal elongated troughs of substantial widths, with adjacent sides turned upwardly, extending through an angular range of 60 to zero degrees, said apparatus being further provided with means for collecting liquids coming from the base of said randomly dumped packed beds, and said first construction elements being provided with liquid redistributing means, said liquid to be delivered to entities below the apparatus, said horizontal elongated troughs being separated from each other by substantial distances, the adjacent ends of said horizontal elongated troughs abutting into circumferential flow channels, arranged horizontally along the inside wall of said contacting towers, said substantial distances between the elongated horizontal troughs being spanned by second construction elements in the form of means forming elongated upwardly extending chambers, wherein said second construction elements are separate elements from said first construction elements and said second construction elements are resting removably within the adjacent upturned sides of the first construction elements, and possess aperture means for distributing gas upwardly into said beds.

3. Apparatus as cited in claim 2 wherein the second construction elements are in the form of means forming elongated upwardly extending arcuate chambers.

4. Apparatus as cited in claim 2 wherein the second construction elements and apertures therein are formed by thin elongated strips, spaced sufficiently close to each other to prevent packing used in the tower from falling into the inside of the second construction elements.

5. Apparatus as cited in claim 2 wherein said aperture means are essentially of elongated rectangular shape.

6. Apparatus as cited in claim 2 wherein the rims defining the outlines of said aperture means have been turned upwardly, so as to make contact with the packings used in the tower, and thus permit the liquid emanating from the base of the packed bed resting on said second construction elements to run off downwardly into the first construction elements.

7. Apparatus as cited in claim 2 wherein said circular openings have been formed to form a short downward extension.

8. Apparatus as cited in claim 2 wherein said angular range will vary between 45 and zero degrees.

9. Apparatus as cited in claim 2 wherein said angular range will vary between 35 to zero degrees.

10. Apparatus as cited in claim 2 wherein the liquid redistributing means in said first construction elements are in the form of circular openings.

11. Apparatus as cited in claim 10 wherein said circular openings are flared at their entrance.

* * * * *